United States Patent
Qin (10) Patent No.: US 9,755,929 B2
(45) Date of Patent: Sep. 5, 2017

(54) METHOD AND APPARATUS FOR LINK CHECK IN PASSIVE OPTICAL NETWORK

(71) Applicant: ZTE Corporation, Shenzhen, Guangdong (CN)

(72) Inventor: Zunming Qin, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/768,729

(22) PCT Filed: Aug. 20, 2013

(86) PCT No.: PCT/CN2013/081855
§ 371 (c)(1),
(2) Date: Aug. 18, 2015

(87) PCT Pub. No.: WO2013/189381
PCT Pub. Date: Dec. 27, 2013

(65) Prior Publication Data
US 2016/0006631 A1     Jan. 7, 2016

(30) Foreign Application Priority Data

Feb. 18, 2013    (CN) .......................... 2013 1 0052781

(51) Int. Cl.
*H04J 14/02*     (2006.01)
*H04L 12/26*     (2006.01)
(Continued)

(52) U.S. Cl.
CPC ...... *H04L 43/0811* (2013.01); *H04J 14/0227* (2013.01); *H04L 12/2885* (2013.01);
(Continued)

(58) Field of Classification Search
CPC .................................................. H04J 14/0227
See application file for complete search history.

(56) References Cited

U.S. PATENT DOCUMENTS 8,737,234 B2 *   5/2014   Zhang ................ H04L 12/2697
                                                                                           370/241
2008/0232804 A1   9/2008   Absillis
(Continued)

FOREIGN PATENT DOCUMENTS

CN       101577632 A     11/2009
CN       101675615 A      3/2010
(Continued)

OTHER PUBLICATIONS

International Search Report in international application No. PCT/CN2013/081855, mailed on Nov. 28, 2013.
(Continued)

*Primary Examiner* — Nathan Curs
(74) *Attorney, Agent, or Firm* — Oppedahl Patent Law Firm LLC (57) ABSTRACT

A method and an apparatus for checking a PON link are provided. The method includes that MEPs are established respectively at the OLT interface of an OLT and the network interfaces of a plurality of gateways to form an access OAM domain; and in the access OAM domain, an Ethernet OAM message is sent between the MEP of the OLT and the MEP of the corresponding gateway to test the continuity of a service link between the OLT interface of the OLT and the corresponding gateway. Thus, the related functions of the ONU are transferred to the OLT, the OLT simulates the UNI of the ONU to enable the Ethernet OAM function and monitors in real time or manually checks the status of the service link from the gateway to the OLT, so that a failure point of an internal service layer of an access node is determined, the cost on the ONU device and the system configuration and administration cost are reduced greatly, and the Ethernet maintenance requirement of an optical access node in the TR101VLAN architecture is met.

13 Claims, 3 Drawing Sheets

(51) Int. Cl.
*H04L 12/28* (2006.01)
*H04Q 11/00* (2006.01)
*H04L 12/24* (2006.01)
*H04L 12/707* (2013.01)

(52) U.S. Cl.
CPC .......... *H04L 41/04* (2013.01); *H04L 41/0686* (2013.01); *H04L 45/22* (2013.01); *H04Q 11/0067* (2013.01); *H04L 41/0213* (2013.01); *H04Q 2011/0081* (2013.01); *H04Q 2011/0083* (2013.01)

(56) References Cited

U.S. PATENT DOCUMENTS

| | | | | |
|---|---|---|---|---|
| 2008/0279105 | A1* | 11/2008 | Absillis | H04J 3/14 370/236.2 |
| 2010/0188983 | A1 | 7/2010 | Washam | |
| 2012/0128356 | A1 | 5/2012 | Zhang | |
| 2012/0294154 | A1* | 11/2012 | Missett | H04L 43/0811 370/241.1 |

FOREIGN PATENT DOCUMENTS

| | | |
|---|---|---|
| CN | 101998189 A | 3/2011 |
| CN | 102082979 A | 6/2011 |
| EP | 2466794 A1 | 6/2012 |
| WO | 2008137614 A1 | 11/2008 |

OTHER PUBLICATIONS

English Translation of the Written Opinion of the International Search Authority in international application No. PCT/CN2013/081855, mailed on Nov. 28, 2013.

Supplementary European Search Report in European application No. 13807738.3, mailed on Dec. 18, 2015.

* cited by examiner

METHOD AND APPARATUS FOR LINK CHECK IN PASSIVE OPTICAL NETWORK

TECHNICAL FIELD

The present disclosure relates to the technical field of optical communications, in particular to a method and an apparatus for link check in a Passive Optical Network (PON).

BACKGROUND

A method for maintaining an access network based on Ethernet is defined in the Operation Administration and Maintenance (OAM) in the seventh section of the Broadband Forum (BBF) standard TR101. In the section, the following four levels of administration domains are defined based on the method of the IEEE standard 802 lag and in combination with the actual situation of the access network: customer, carrier, intra-carrier and end access link. In each domain, the function of a Maintenance End Point (MEP) is implemented between two end points, and the function of a Maintenance Intermediate Point (MIP) is implemented in the middle of a link. An Ethernet OAM message is sent, forwarded and replied between the MEP and the MIP to help to locate a specific failure interrupt area in the Ethernet.

The four administration domains defined in the standard above are mainly to provide an end-to-end method for a carrier in the Ethernet to help the carrier diagnose and determine a link failure. The original access technology is mainly a Digital Subscriber Line (DSL) technology, therefore, an Access Node (AN) mainly behaves as an independent Digital Subscriber Line Access Multiplexer (DSLAM) device. After the PON technology is introduced into the access network, the original separate access node has been expanded into a network which is formed by an Optical Line Terminal (OLT), an Optical Network Unit (ONU) and an Optical Distribution Network (ODN).

For the end-to-end customer domain, all the terminals of the whole network are subjected to Ethernet OAM configuration, as a result, the operation cost of the network is high, and the whole network cannot be applied commercially easily. Whereas, for the whole network, a failure generally occurs in an access network, therefore, to deploy the Ethernet OAM, the most important is to enable an Ethernet OAM function in the access link maintenance domain.

Specifically, for a PON system, the Ethernet OAM between a User Network Interface (UNI) of the ONU and the uplink port of an access Remote Gateway (RG) or a home gateway is especially important. The Ethernet OAM function is generally enabled by the ONU, thus a high requirement is set for the ONU device, and the ONU device is relatively complex to configure and administrate and prone to be configured wrongly. Moreover, each remote gateway or home gateway is different in equipment configuration, so that the construction cost and the operation cost of the whole PON cannot be controlled effectively.

SUMMARY

The main objective of embodiments of the present disclosure is to provide a method and an apparatus for link check in a PON for the diagnosis of a failure on an Ethernet layer between an OLT and a remote gateway device under an ONU.

For this end, an embodiment of the present disclosure provides a method for link check in a PON, including that:

MEPs are established respectively at an OLT interface of an OLT and at network interfaces of a plurality of gateways to form an access OAM domain; and in the access OAM domain, an Ethernet OAM message is sent between the MEP of the OLT and an MEP of a corresponding gateway to test continuity of a service link between the OLT interface of the OLT and the corresponding gateway.

Preferably, the Ethernet OAM message may carry a Virtual LAN Identifier (VID) corresponding to a virtual LAN property of a user.

Preferably, the step that an Ethernet OAM message is sent between the MEP of the OLT and an MEP of a corresponding gateway to test continuity of a service link between the OLT interface of the OLT and the corresponding gateway may include:

the Ethernet OAM function is enabled for the OLT on a network management platform to trigger a loop check command from the OLT to a corresponding gateway;

the OLT sends a loop check message from the OLT interface to the MEP of the corresponding gateway through the MEP of the OLT according to the loop check command; and when receiving a loop check response message returned by the corresponding gateway, the OLT indicates success of link check; otherwise, the OLT indicates failure of the link check and reports a link abnormality warning message to the network management platform.

Preferably, the step that an Ethernet OAM message is sent between the MEP of the OLT and an MEP of a corresponding gateway to test continuity of a service link between the interface of the OLT and the corresponding gateway may include:

in the access OAM domain, a link automatic continuity check function is enabled between the MEP of the OLT and the MEP of the corresponding gateway;

the OLT and the corresponding gateway send a continuity check message to each other between the MEP of the OLT and the MEP of the corresponding gateway through a corresponding port;

if the OLT fails to receive the continuity check message from the corresponding gateway, or, if the OLT fails to receive a loop check response message from the corresponding gateway within a predetermined time, then the failure of the link check is indicated, and a link abnormality warning message is reported to the network management platform; otherwise, the success of the link check is indicated.

Preferably, the method may further include:

when the link check is failed, a status of a ONU device in the service link is viewed, or a link tracing command is enabled to locate a specific position of a failure; or, the OLT implements an automatic protection switching function.

Preferably, the method may further include:

in the access OAM domain, a performance testing function is enabled in real time or as required between the MEP of the OLT and the MEP of the corresponding gateway; and the performance testing function at least includes testing packet loss, time delay, jitter and availability.

Preferably, the gateways may at least include a remote gateway or a home gateway.

An embodiment of the present disclosure further discloses an apparatus for link check in a PON, including:

an establishment module, which is configured to establish MEPs respectively at an OLT interface of an OLT and at network interfaces of a plurality of gateways to form an access OAM domain; and a testing module, which is configured to, in the access OAM domain, send an Ethernet OAM message between the MEP of the OLT and an MEP of a corresponding gateway to test continuity of a service link between the OLT interface of the OLT and the corresponding gateway.

The establishment module and the testing module may be implemented by a Central Processing Unit (CPU), a Digital Signal Processor (DSP) or a Field Programmable Gate Array (FPGA).

Preferably, the testing module may be further configured to enable an Ethernet OAM function for the OLT on a network management platform to trigger a loop check command from the OLT to the corresponding gateway; the OLT sends a loop check message from the OLT interface to the MEP of the corresponding gateway through the MEP of the OLT according to the loop check command; and when receiving a loop check response message returned by the corresponding gateway, the OLT indicates the success of the link check; otherwise, the OLT indicates the failure of the link check and reports a link abnormality warning message to the network management platform.

Preferably, the testing module may be further configured to, in the access OAM domain, enable a link automatic continuity check function between the MEP of the OLT and the MEP of the corresponding gateway; the OLT and the corresponding gateway send a continuity check message to each other between the MEP of the OLT and the MEP of the corresponding gateway through a corresponding port; if the OLT fails to receive the continuity check message from the corresponding gateway or if the OLT fails to receive a loop check response message from the corresponding gateway within a predetermined time, then the link check is indicated to be failed, and a link abnormality warning message is reported to the network management platform; otherwise, the success of the link check is indicated.

Preferably, the testing module may be further configured to, when the link check is failed, view a status of an ONU device in the service link, or enable a link tracing command to position the specific position of a failure; or, the OLT implements an automatic protection switching function.

Preferably, the testing module may be further configured to, in the access OAM domain, enable a performance testing function in real time or as required between the MEP of the OLT and the MEP of the corresponding gateway, wherein the performance testing function at least includes testing packet loss, time delay, jitter and availability.

Preferably, the gateways may at least include a remote gateway or a home gateway.

According to the method and the apparatus for link check in a PON, in a PON, the related functions of an ONU are transferred to an OLT, the OLT simulates the UNI of the ONU to enable the Ethernet OAM function and monitors in real time or manually checks the status of a service link from the gateway to the OLT, so as to help the carrier determine a failure point on an internal service layer of an access node; thus, the cost of the ONU device is greatly reduced, and the system configuration and the administration cost are reduced, moreover, the construction cost and the operation cost of the whole PON are controlled effectively, and the carrier is facilitated to meet the Ethernet maintenance requirement of an optical access node in the TR101VLAN architecture.

DETAILED DESCRIPTION

In the embodiments, based on the diagnosis mechanism for the failure of the Ethernet layer between an OLT and a remote gateway device of an ONU, the OLT replaces a plurality of ONUs to complete an OAM function without affecting the operation of the original business, thereby meeting the Ethernet maintenance requirement of an optical access node under the TR101VLAN architecture of the carrier.

Figure 1:
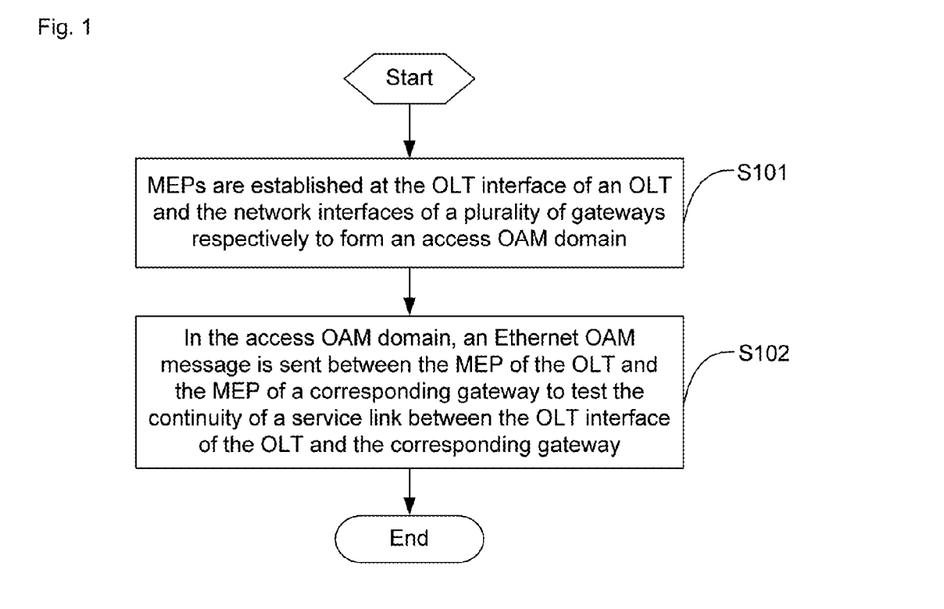
FIG. 1 is a schematic diagram showing the flow of a method for link check in a PON according to an embodiment of the present disclosure.

As shown in FIG. 1, an embodiment of the present disclosure provides a method for link check in a PON, including the following steps.

Step 101 includes that MEPs are established respectively at the OLT interface of an OLT and the network interfaces of a plurality of gateways respectively to form an access OAM domain.

The embodiment refers to an OAM method for an Ethernet access network which is formed between the OLT and a remote gateway (RG) or a Home Gateway (HGW) (wherein the RG and the HGW are same in status, and only the RG is described below).

Figure 2:
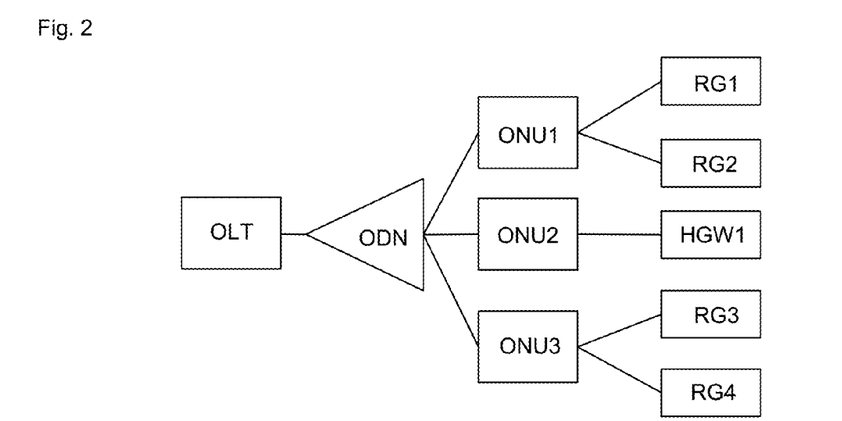
FIG. 2 is a schematic diagram showing the architecture of a PON system according to an embodiment of the present disclosure.

The architecture of a PON system mentioned here is as shown in FIG. 2, the PON consists of an OLT, an ODN, an ONU and an RG, wherein a plurality of RGs can be connected under the ONU.

Figure 3:
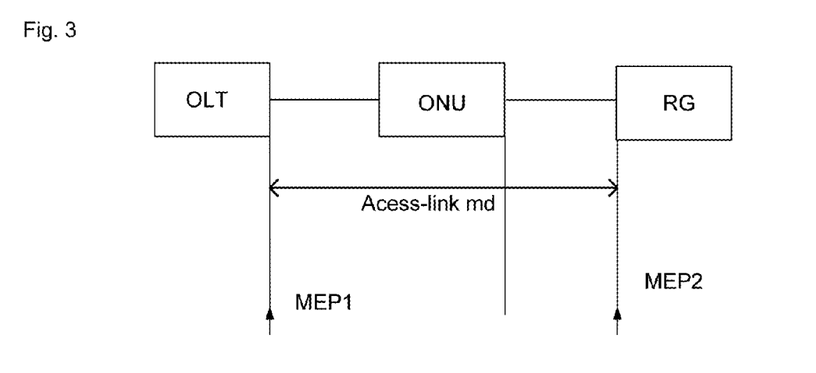
FIG. 3 is a schematic diagram showing the operation, maintenance and deployment of Ethernet in a PON according to an embodiment of the present disclosure.

Firstly, an MEP is established at the OLT of the PON, and a plurality of MEPs are established at a plurality of RGs, so as to form an access OAM domain including the MEPs. As shown in FIG. 3, an access OAM domain is established between the OLT and an RG, the OLT and the RG serve as MEP1 and MEP2 respectively, and the ONU optionally serves as an MIP 100.

Therefore, the access OAM domain defined by the original standard TR101 is transferred from the UNU interface of the ONU to the OLT interface, and the OLT replaces a plurality of ONUs to serve as an OAM terminal to complete the function of an OAM terminal; thus, the ONU does not need to support the Ethernet OAM function any more or optionally supports the function of an OAM intermediate point, so as to reduce the cost of the ONU device.

Step 102 includes that in the access OAM domain, an Ethernet OAM message is sent between the MEP of the OLT and the MEP of the corresponding gateway to test the continuity of a service link between the OLT interface of the OLT and the corresponding gateway.

In the access OAM domain, an Ethernet OAM message is sent between the MEP of the OLT and the MEP of a corresponding gateway, and according to the VLAN property of a user, a VID corresponding to the VLAN property of the user is carried in the Ethernet OAM message.

For example, if MEP 1 is established at the OLT interface of the OLT, and MEPs 2, 3 . . . N are established at the network interfaces of a plurality of RGs to form an access OAM domain, then MEP 1 may serve as the start point of the test, and another MEP 2 may serve as the end point of the test, and an Ethernet OAM message is sent from the start point to the end point to test the continuity of a service link between a specific RG and the OLT interface.

Preferably, in the embodiment, the OAM of the RGs can be simplified; all the RGs at the same OLT interface are provided with a same peer-end operation and administration terminal so as to implement large-scale Ethernet OAM deployment easily. While in the existing operation and administration access domain defined in the standard TR101, different peer-end operation and administration terminals are configured and it is easy to make a mistake in the configuration, therefore the Ethernet OAM cannot be deployed in a large scale easily.

Preferably, in the solution of the embodiment, the operation and administration of the OLT of the PON can be simplified; and only one operation and administration terminal needs to be configured for one OLT interface. While in the existing operation and administration access domain defined in the TR101, one operation and administration terminal needs to be defined for the UNI of each ONU, and each operation and administration terminal is different, as a result, it is easy to make a mistake in the configuration.

In the embodiment, a network personnel can enable an Ethernet OAM function for the OLT manually on a network management platform to trigger an Ethernet loopback command of the RG or a link-trace command and check the continuity between the OLT and the RG and the specific position of a failure; or, an automatic Continuity Check Message (CCM) can be enabled to monitor the continuity between MEPs and report to the network management platform in real time when finding the failure, and the operating personnel manually interferes or carries out related protection switching operation.

The two application scenarios above are described below in detail.

Figure 4:
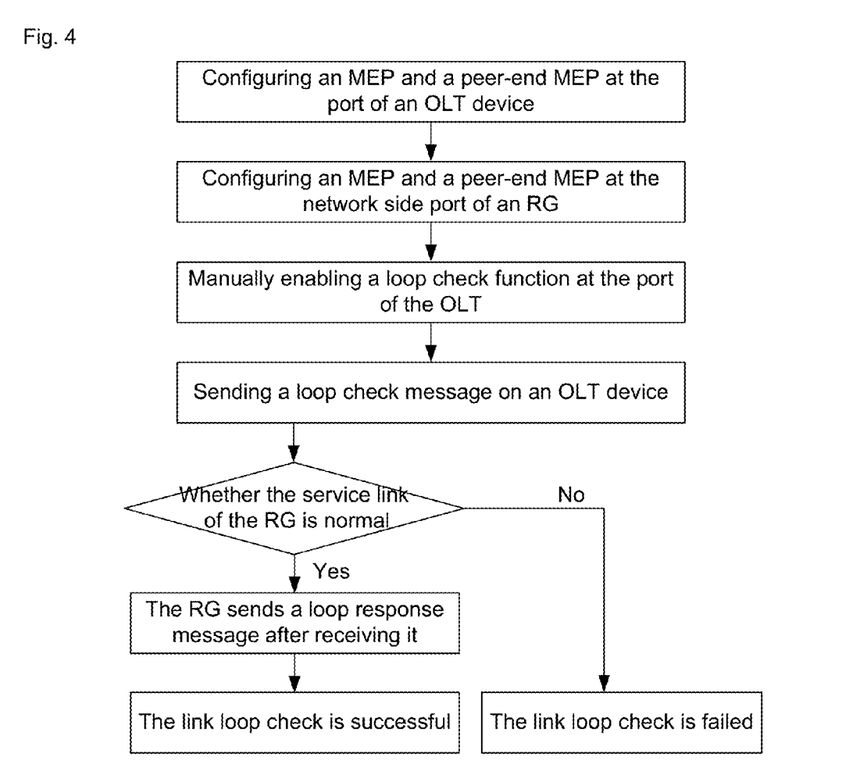
FIG. 4 is a schematic diagram showing the operation and maintenance flow (manually triggered) of Ethernet in a PON according to an embodiment of the present disclosure.

As shown in FIG. 4, which is a diagram showing the operation and maintenance flow (manual triggering) of Ethernet in a PON according to an embodiment of the present disclosure, specifically including:

step 1: an MEP is established and an internal OAM domain including the MEP is formed at the OLT interface of an optical access node, and a local MEP1 as well as the MEP2, MEP3 . . . MEPN of a plurality of RGs are configured;

step 2: an MEP is established and an internal OAM domain including the MEP is formed in RG1; and a local MEP2 and a peer-end MEP1 (i.e., MEP1 on the corresponding OLT interface) are configured;

similarly, an MEP is established and an internal OAM domain including the MEP is formed at RG2; and a local MEP3 and a peer-end MEP1 (i.e., MEP 1 on the corresponding OLT interface) are configured;

step 3: when a network manager finds the abnormality of a service in the RG1, the OLT is triggered on a network management platform to check the loop of the OLT where RG1 is located;

step 4: the OLT sends an LB message at an OLT interface, wherein the destination address is the MAC address of MEP2, and the source address is MEP1 address; and step 5: if the service link between the OLT and RG1 runs normally, RG1 receives a loop check message from the OLT and sends a loop check response message to the OLT; the OLT, after receiving the loop check response message, considers the link to be normal and indicates the success of the link check; thus, an uplink network device of an optical line device instead of a service link between the OLT and the RG can be determined to be abnormal in service.

If the link between the OLT and RG1 runs abnormally, RG1 will not receive the loop check message or cannot deliver a response message to the OLT device; when failing to receive the loop check response message within a predetermined time, the OLT will show the failure of the loop check and report a link abnormality warning message to the network management platform; and a network manager can locate that the service failure occurs at the link between the OLT and the RG.

In addition, by further checking, the status of the ONU device may be viewed or a link tracing function (the ONU needs to enable the MIP function) may be enabled, to further locate the specific position of the failure.

Figure 5:
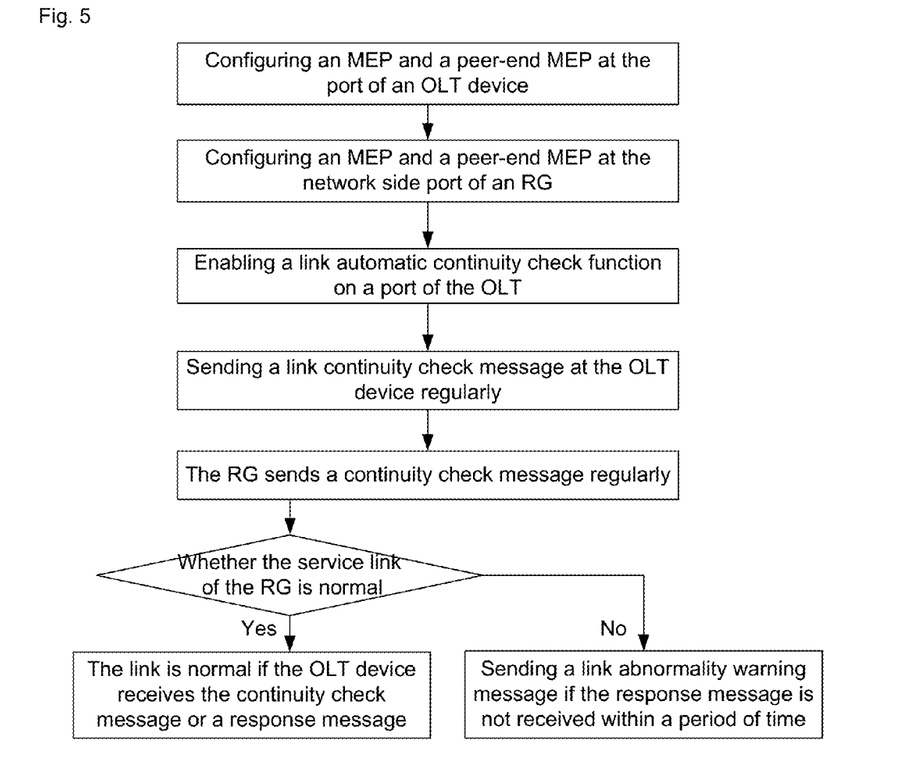
FIG. 5 is a schematic diagram showing the operation and maintenance flow (automatically checked) of Ethernet in another PON according to an embodiment of the present disclosure.

As shown in FIG. 5, which is a schematic diagram showing the operation and maintenance flow (manually triggered) of Ethernet in another PON according to an embodiment of the present disclosure, specifically including:

step 11: same as step 1 in FIG. 4;

step 12: same as step 2 in FIG. 4;

step 13: a network manager actively enables a continuity link check function and configures a peer-to-peer continuity link check enabling at the OLT and the RG;

step 14: the OLT sends a continuity check message at an OLT interface, wherein the destination address is a multicast address or an MAC address of MEP2, and the source address is the MAC address of MEP1;

the RG sends a continuity check message at an uplink port, wherein the destination address is a multicast address or the MAC address of MEP1, and the source address is the MAC address of MEP2;

step 15: if the link between the OLT and RG1 runs normally, RG1 receives a link continuity check message from the OLT, the OLT also receives a link continuity check message from RG1, and a network management platform will not receive a link abnormality warning message.

If the link between the OLT and RG1 runs abnormally, the link continuity check message sent by RG1 cannot be delivered to the OLT; the OLT, when failing to receive a loop check response message within a predetermined time, will actively report a link abnormality message to the network management platform; and the network manager further manually check the abnormal position of the link or the device implements an automatic protection switching function.

Preferably, in the access OAM domain, a performance testing function, including testing packet loss, time delay, jitter and availability, can be enabled in real time or as required between the operation and maintenance end point of the OLT interface and the operation and maintenance point of the network side interface of each RG.

In the embodiment, based on the diagnosis mechanism for the failure of the Ethernet layer between the OLT and a remote gateway of the ONU, the OLT replaces a plurality of ONUs to complete an OAM function without affecting the operation of the original service, thus, the carrier is facilitated to meet the Ethernet maintenance requirement of an optical access node under the TR101 VLAN architecture.

Figure 6:
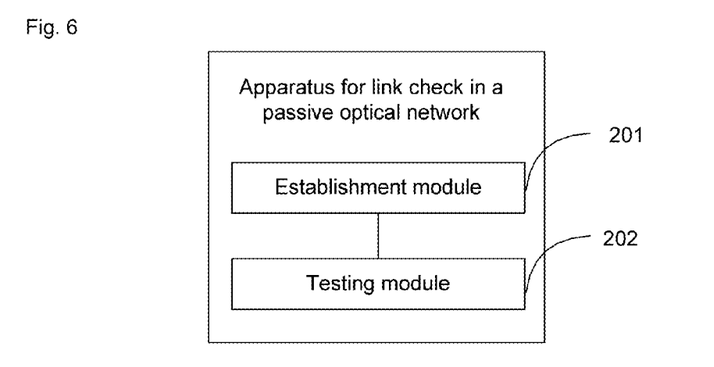
FIG. 6 is a schematic diagram showing the structure of an apparatus for link check in a PON according to an embodiment of the present disclosure.

As shown in FIG. 6, an embodiment of the present disclosure provides an apparatus for link check in a PON, including an establishment module 201 and a testing module 202, wherein the establishment module 201 is configured to establish MEPs respectively at the OLT interface of an OLT and at the network interfaces of a plurality of gateways to form an access OAM domain; and the testing module 202 is configured to, in the access OAM domain, send an Ethernet OAM message between the MEP of the OLT and the MEP of the corresponding gateway to test the continuity of a service link between the interface of the OLT and the corresponding gateway.

Specifically, the embodiment refers to an OAM method for an Ethernet access network which is formed between the OLT and an RG or an HGW (wherein the RG and the HGW are same in status, and only the RG is described below).

The architecture of a PON system is as shown in FIG. 2, the PON consists of an OLT, an ODN, an ONU and an RG, wherein a plurality of RGs can be connected in the ONU.

Firstly, an MEP is established at the OLT of the PON, and a plurality of MEPs are established at a plurality of RGs, so as to form an access OAM domain including the MEPs. As shown in FIG. 3, an access OAM domain is established between the OLT and the RG, the OLT and the RG serve as MEP1 and MEP2 respectively, and the ONU may optionally serve as an MIP 100.

Therefore, the original access OAM domain defined by the standard TR101 is transferred from the UNU interface of the ONU to the OLT interface, and the OLT replaces a plurality of ONUs to serve as an OAM terminal to complete the function of the OAM terminal, thus, the ONU does not need to support the Ethernet OAM function any more or optionally supports the function of an MIP, and accordingly the cost of the ONU is reduced.

Then, in the access OAM domain, an Ethernet OAM message is sent between the MEP of the OLT and the MEP of a corresponding gateway, and according to the VLAN property of a user, a VID corresponding to the VLAN property of the user is carried in the Ethernet OAM message.

For example, if MEP 1 is established at the OLT interface of the OLT, and MEPs 2, 3 . . . N are established at the network interfaces of a plurality of RGs to form an access OAM domain, then MEP 1 may serve as the start point for the test, and MEP 2 may serves as the end point for the test, and an Ethernet OAM message is sent from the start point to the end point to test the continuity of a service link between a specific RG and the OLT interface.

Preferably, in the embodiment, the OAM of the RGs can be simplified; all the RGs at the same OLT interface are provided with a same peer-end operation and administration terminal so as to implement large-scale Ethernet OAM deployment easily. While in the existing operation and administration access domain defined in the standard TR101, different peer-end operation and administration terminals are configured and it is easy to make a mistake in the configuration, as a result, the Ethernet OAM cannot be deployed in a large scale easily.

Preferably, in the solution of the embodiment, the operation and administration of the OLT of the PON can be simplified, and only one operation and administration terminal needs to be configured for one OLT interface. While in the existing operation and administration access domain defined in the TR101, one operation and administration terminal needs to be defined for the UNI of each ONU, and the operation and administration terminals are different from each other, it is easy to make a mistake in the configuration.

In the embodiment, a network personnel can enable an Ethernet OAM function for the OLT manually on a network management platform to trigger an Ethernet loopback command of the RG or a link-trace command and check the continuity between the OLT and the RG and the specific position of a failure; or, an automatic Continuity Check Message (CCM) can be enabled to monitor the continuity between each MEP and report to the network management platform in real time when the failure is found, and a personnel manually interferes or carries out related protection switching operation.

The two application scenarios above are described below in detail.

As shown in FIG. 4, which is a diagram showing the operation and maintenance flow (manually triggered) of Ethernet in a PON according to an embodiment of the present disclosure, specifically including:

step 1: an MEP is established and an internal OAM domain including the MEP is formed at the OLT interface of an optical access node, and the MEP2, MEP3 . . . MEPN of a plurality of RGs and a local MEP1 are configured;

step 2: an MEP is established and an internal OAM domain including the MEP is formed in RG1; and a local MEP2 and a peer-end MEP1 (i.e., MEP1 at the corresponding OLT interface) are configured;

similarly, an MEP is established and an internal OAM domain including the MEP is formed at RG2; and a local MEP3 and a peer-end MEP1 (i.e., MEP 1 at the corresponding OLT interface) are configured;

step 3: when a network manager finds the abnormality of a service under the RG1, the OLT is triggered on a network management platform to check the loop of the OLT where RG1 is located;

step 4: the OLT sends an LB message at an OLT interface, wherein the destination address is the MAC address of MEP2, and the source address is the address of MEP1; and step 5: if the service link between the OLT and RG1 runs normally, then RG1 receives a loop check message from the OLT and sends a loop check response message to the OLT; the OLT, after receiving the loop check response message, considers the link to be normal and indicates the success of the link check; thus, an uplink network device of an optical line device, instead of a service link between the OLT and the RG, can be located to be abnormal in service If the link between the OLT and RG1 runs abnormally, then RG1 cannot receive the loop check message or deliver a response message to the OLT device; when failing to receive the loop check response message within a predetermined time, the OLT may indicate the failure of the loop check and report a link abnormality warning message to the network management platform; and a network manager can locate the position of the service failure to be at the link between the OLT and the RG.

In addition, the status of the ONU device can be viewed by further checking, or a link tracing function (the ONU needs to enable the MIP function) is enabled, to further locate the specific position of the failure.

As shown in FIG. 5, which is a diagram showing the operation and maintenance flow (manually triggered) of Ethernet in another PON according to an embodiment of the present disclosure, specifically including:

step 11: same as step 1 in FIG. 4;
step 12: same as step 2 in FIG. 4;
step 13: a network manager actively enables a continuity link check function and configures a peer-to-peer continuity link check enabling on the OLT and the RG;

step 14: the OLT sends a continuity check message at an OLT interface, wherein the destination address is a multicast address, or an MAC address of MEP2, and the source address is the MAC address of MEP1;

the RG sends a continuity check message at an uplink port, wherein the destination address is a multicast address, or the MAC address of MEP1, and the source address is the MAC address of MEP2; and step 15: if the link between the OLT and RG1 runs normally, RG1 receives a link continuity check message from the OLT, the OLT also receives a link continuity check message from RG1, and a network management platform will not receive a link abnormality warning message.

If the link between the OLT and RG1 runs abnormally, the link continuity check message sent by RG1 cannot be delivered to the OLT; the OLT, when failing to receive a loop check response message within a predetermined time, actively reports a link abnormality message to the network management platform; and the network manager further manually checks the abnormal position of the link or the device implements an automatic protection switching function.

Preferably, in the access OAM domain, a performance testing function, including testing packet loss, time delay, jitter and availability, can be enabled in real time or as required between the operation and maintenance end point of the OLT interface and the operation and maintenance point of the network side interface of each RG.

According to the method and the apparatus for link check in a PON, in the PON, the related functions of an ONU are transferred to an OLT, the OLT simulates the UNI of the ONU to enable the Ethernet OAM function and monitors in real time or manually checks the status of a service link from a gateway to the OLT, so as to help a personnel determine a failure point of an internal service layer of an access node; thus, the cost of the ONU device is greatly reduced, and the system configuration and the administration cost are reduced, moreover, the construction cost and the operation cost of the whole PON are controlled effectively, and the personnel is facilitated to meet the Ethernet maintenance requirement of an optical access node in the TR101VLAN architecture.

The above are only the preferred embodiments of the present disclosure, and not intended to limit the scope of protection of claims of the present disclosure.

INDUSTRIAL APPLICABILITY

According to the embodiments, in a PON, the related functions of an ONU are transferred to an OLT, the OLT simulates the UNI of the ONU to enable the Ethernet OAM function and monitors in real time or manually checks the status of a service link from a gateway to the OLT, so as to help the personnel determine a failure point of the internal service layer of an access node; thus, the cost of the ONU device is greatly reduced, and the system configuration and the administration cost are reduced; moreover, the construction and operation cost of the whole PON are controlled effectively, and the personnel is facilitated to meet the Ethernet maintenance requirement of an optical access node in the TR101VLAN architecture.

The invention claimed is:

1. A method for link check in a Passive Optical Network (PON), comprising: establishing Maintenance End Points (MEPs) respectively at an Optical Line Terminal (OLT) interface of an OLT and at network interfaces of a plurality of gateways to form an access Operation, Administration and Maintenance (OAM) domain, the gateway is connected to an Optical Network Unit (ONU), and the ONU is connected to the OLT through Optical Distribution Network (ODN); and in the access OAM domain, sending an Ethernet OAM message between the MEP of the OLT and an MEP of a corresponding gateway to test continuity of a service link between the OLT interface of the OLT and the corresponding gateway, wherein the step of sending an Ethernet OAM message between the MEP of the OLT and an MEP of a corresponding gateway to test continuity of a service link between the OLT interface of the OLT and the corresponding gateway comprises: when the OLT receives a loop check response message returned by the corresponding gateway, determining, by the OLT, a success of link; otherwise, determining, by the OLT, a failure of the link and reporting a link abnormality warning message to the network management platform;

or in the alternative, wherein the step of sending an Ethernet OAM message between the MEP of the OLT and an MEP of a corresponding gateway to test continuity of a service link between the OLT interface of the OLT and the corresponding gateway comprises: in the access OAM domain, enabling a link automatic continuity check function between the MEP of the OLT and the MEP of the corresponding gateway; sending, by the OLT and the corresponding gateway, a continuity check message to each other between the MEP of the OLT and the MEP of the corresponding gateway through a corresponding port; continuity check message from the corresponding gateway, or, if the OLT fails to receive a loop check response message from the corresponding gateway within a predetermined time, then determining, by the OLT, a failure of link and reporting a link abnormality warning message to a network management platform; otherwise, determining, by the OLT, a success of the link.

2. The method according to claim 1, wherein the Ethernet OAM message carries a Virtual Local Area Network (LAN) Identifier (VID) corresponding to a virtual LAN property of a user.

3. The method according to claim 1, further comprising: when the link is failed, checking a status of the ONU in the service link, or enabling a link tracing command to locate a specific position of a failure; or, implementing, by the OLT, an automatic protection switching function.

4. The method according to claim 3, further comprising: in the access OAM domain, enabling a performance testing function at a predetermined time between the MEP of the OLT and the MEP of the corresponding gateway, wherein the performance testing function at least comprises testing packet loss, time delay, jitter and availability.

5. The method according to claim 1, wherein the gateways at least comprise a remote gateway or a home gateway.

6. The method according to claim 1, further comprising: when the link is failed, checking a status of the ONU in the service link, or enabling a link tracing command to locate a specific position of a failure; or, implementing, by the OLT, an automatic protection switching function.

7. The method according to claim 6, further comprising: in the access OAM domain, enabling a performance testing function at a predetermined time between the MEP of the OLT and the MEP of the corresponding gateway, wherein the performance testing function at least comprises testing packet loss, time delay, jitter and availability.

8. An apparatus for link check in a Passive Optical Network (PON), comprising a processor, wherein the processor is configured to be capable of executing instructions to perform steps comprising: establishing Maintenance End Points (MEPs) respectively at an Optical Line Terminal (OLT) interface of an OLT and at network interfaces of a plurality of gateways to form an access Operation, Administration and Maintenance (OAM) domain, the gateway is connected to an Optical Network Unit (ONU), and the ONU is connected to the OLT through Optical Distribution Network (ODN); and in the access OAM domain, sending an Ethernet OAM message between the MEP of the OLT and an MEP of a corresponding gateway to test continuity of a service link between the OLT interface of the OLT and the corresponding gateway wherein the processor is configured to be capable of executing instructions to perform steps further comprising: enabling an Ethernet OAM function for the OLT on a network management platform to trigger a loop check command from the OLT to the corresponding gateway; the OLT sending a loop check message from the OLT interface to the MEP of the corresponding gateway through the MEP of the OLT according to the loop check command; and when receiving a loop check response message returned by the corresponding gateway, the OLT determining success of link; otherwise, the OLT determining a failure of the link and reports a link abnormality warning message to the network management platform or in the alternative, wherein the processor is configured to be capable of executing instructions to perform steps further comprising: enabling a link automatic continuity check function between the MEP of the OLT and the MEP of the corresponding gateway; the OLT and the corresponding gateway respectively sending a continuity check message to each other between the MEP of the OLT and the MEP of the corresponding gateway through a corresponding port; if the OLT fails to receive the continuity check message from the corresponding gateway or if the OLT fails to receive a loop check response message from the corresponding gateway within a predetermined time, then a failure of link is determined, and a link abnormality warning message is reported to a network management platform; otherwise, a success of the link is determined.

9. The apparatus according to claim 8, wherein the processor is configured to be capable of executing instructions to perform steps further comprising: when the link check is failed, checking a status of an ONU in the service link, or enabling a link tracing command to locate a specific position of a failure; or, the OLT implementing an automatic protection switching function.

10. The apparatus according to claim 9, wherein the processor is configured to be capable of executing instructions to perform steps further comprising: in the access OAM domain, enabling a performance testing function at a predetermined time between the MEP of the OLT and the MEP of the corresponding gateway, wherein the performance testing function at least comprises testing packet loss, time delay, jitter and availability.

11. The apparatus according to claim 8, wherein the gateways at least comprise a remote gateway or a home gateway.

12. The apparatus according to claim 8, wherein the processor is configured to be capable of executing instructions to perform steps further comprising: when the link is failed, checking a status of the ONU in the service link, or enabling a link tracing command to locate a specific position of a failure; or, the OLT implementing an automatic protection switching function.

13. The apparatus according to claim 12, wherein the processor is configured to be capable of executing instructions to perform steps further comprising: in the access OAM domain, enabling a performance testing function at a predetermined time between the MEP of the OLT and the MEP of the corresponding gateway, wherein the performance testing function at least comprises testing packet loss, time delay, jitter and availability.

* * * * *